United States Patent

[11] 3,599,931

| [72] | Inventor | Herbert G. Hanson |
| | | Arlington Heights, Ill. |
| [21] | Appl. No. | 857,006 |
| [22] | Filed | Sept. 11, 1969 |
| [45] | Patented | Aug. 17, 1971 |
| [73] | Assignee | G P E Controls, Inc. |
| | | Morton Grove, Ill. |

[54] INTERNAL SAFETY SHUTOFF AND OPERATING VALVE
7 Claims, 10 Drawing Figs.

[52] U.S. Cl.................................................. 251/144,
251/63.5, 277/206, 277/209
[51] Int. Cl................................................ F16k 31/143,
F16j 15/00
[50] Field of Search........................................ 251/144,
62, 63.5, 63.4, 63.6; 277/206, 209

[56] References Cited
UNITED STATES PATENTS
| 2,114,858 | 4/1938 | Rosch............................ | 251/333 X |
| 2,841,429 | 7/1958 | McCuistion................... | 277/209 |
| 2,882,104 | 4/1959 | Guthans........................ | 277/102 UX |
| 2,916,883 | 12/1959 | Geck............................ | 277/102 X |
| 3,104,884 | 9/1963 | Kerlin.......................... | 277/209 X |
| 3,173,699 | 3/1965 | Nathan......................... | 277/209 X |
| 3,199,534 | 8/1965 | Shaw et al.................... | 251/144 X |
| 3,388,719 | 6/1968 | Maginnis...................... | 251/144 X |

Primary Examiner—Henry T. Klinksiek
Attorneys—Julian Falk, Chester A. Williams, Jr., Marshall J. Breen and Kinzer, Dorn & Zichert ABSTRACT: A valve operable to open in response to an operating pressure being supplied to an operating plunger assembly and to close the check close in either direction when the operating pressure is removed. Dynamic seal rings in the valve are spring loaded to compensate for wear and/or thermal contracting conditions, and a seat ring is mounted to likewise compensate for wear and/or thermal contracting conditions.

INVENTOR
HERBERT G. HANSON

BY

ATTORNEY

3,599,931

INTERNAL SAFETY SHUTOFF AND OPERATING VALVE

This invention relates in general to a valve, and more particularly to a valve adapted for remote and quick manual shutoff operation in single or multiple storage tank and line installations, and more particularly to a safety shutoff and operating valve adapted to be used for flammable liquids and gases under pressure conditions and to check in the closed position.

Transfer and storage of LP gas or anhydrous ammonia in ambient or refrigerated switch-type services requires the need of a valve capable of being operated from remote control positions and capable of operating efficiently under pressures encountered with such products. Long life is desired, and therefore such valves must be constructed of materials that resist most corrosive actions encountered to provide a consistent operating action under liquid or vapor exposure. The seals must be able to withstand the pressure conditions encountered and compensate for wear and/or thermal contracting conditions as large differentials of such conditions are normally encountered. A valve meeting these requirements has not been heretofore known.

The valve of the invention is capable of answering the need for remote and quick manual shutoff operations in tank and line installations where large differentials in pressure and temperature are encountered. The valve of the invention includes a body having inlet and outlet ports and a piston assembly with a seal configuration slidable in a cylinder assembly between open and closed positions to open or close communication between the inlet and outlet ports. An operating plunger assembly capable of being driven by a remotely controlled operating pressure serves to open the valve and cause the piston assembly to move to open position. Upon removal of the pressure, a spring drives the piston assembly and seat into closed position, and the construction of the valve is such that it will check close with respect to the pressure on either side of the valve. A sealing ring and a seat ring on the piston and seat assembly seal fluid in either direction and are self-adjusting to any thermal contracting or expanding conditions, Similarly, a seal ring on the operating plunger assembly is self-adjusting to thermal contracting or expanding conditions. The cylinder wall in which the piston and seat assembly slide has a diameter approximately equal to the seating diameter so that the valve will check close with respect to pressure on either side, regardless of the pressures from either side.

It is therefore an object of this invention to provide a new and improved internal safety shutoff and operating valve suitable for remote and quick manual shutoff operation in single or multiple storage tanks or line installations, and which is capable of operating under a large differential in pressure and temperature conditions.

It is a further object of this invention to provide a valve capable of operating under varying pressures from either side in a tank and line installation, and which checks close in either direction regardless of existing tank or line vapor procedures procedures.

Still another object of this invention is to provide a safety shutoff and operating valve for tank and line installations which include components capable of self-adjusting for wear and/or thermal contracting and expanding conditions thereby enhancing its long life.

Other objects, features and advantages of the invention will be apparent from the following detailed disclosure, taken in conjunction with the accompanying sheets of drawings, wherein like reference numerals refer to like parts, in which.

Figure 1:
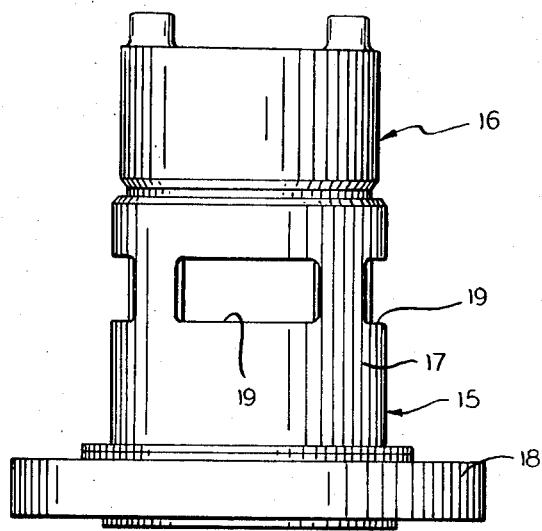
FIG. 1 is a front elevational view of the valve according to the invention.
Figure 2:
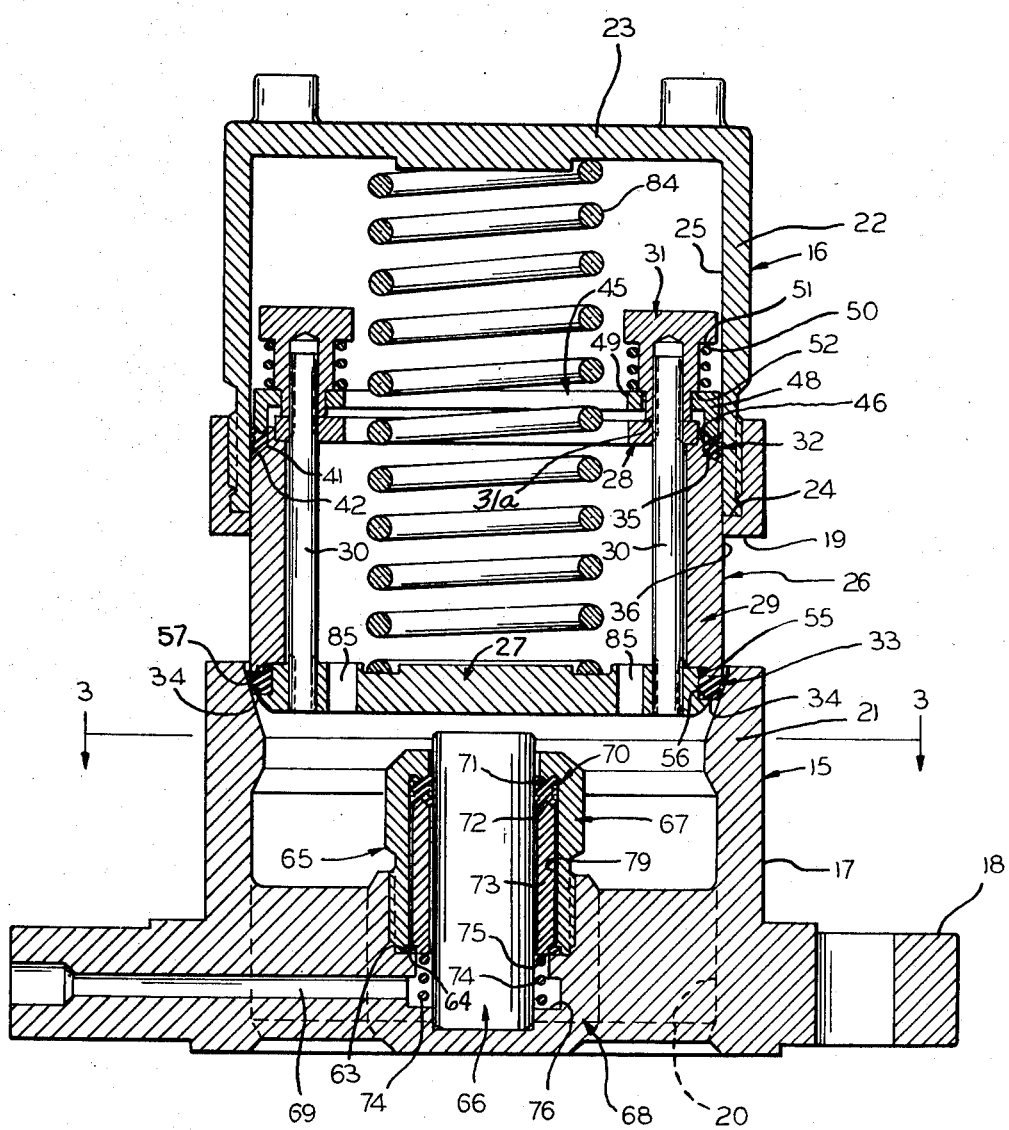
FIG. 2 is a vertical sectional view taken axially through the valve of FIG. 1, and illustrating the valve in closed position.

Referring now to the drawings and particularly to FIGS. 1 and 2, the illustrated preferred embodiment of the invention is shown by itself, and it will be appreciated that the valve will be mounted in tank and line installations to handle flammable liquids and gases. For example, the valve may be mounted within a tank and have attached to one side a line that may be connected to another tank or adapted to be connected to another tank. The valve body generally includes a base 15 and a head or cap 16 separable from the base to facilitate valve assembly and/or maintenance.

The base 15 includes a cylindrical portion 17 having a mounting flange 18 integral with the lower end. A plurality of circumferentially arranged and radially opening ports 19 are provided adjacent the upper end of the cylindrical portion, while a pair of half-moon-shaped passages 20 are provided at the lower end in the flange area. Depending upon the direction of fluid flow through the valve, the set of ports 19 or passages 20 may be considered either inlet or outlet ports. In any event the ports 19 will be in direct communication with a line that would be connected thereto and to the tank. Fluid flow may be into or out of the tank depending upon the switching operations. The cylindrical portion 17 defines a generally upstanding cylindrical wall 21 through which the passages 20 extend.

The upper end of the base 15 is closed by the head or cap 16 which is defined by cylindrical wall 22 closed at the upper end by an end wall 23. The lower end of the cylindrical wall 22 is externally threaded to engage internal threading formed on the upper end of the base cylindrical wall 21 and shoulder 24 formed at the lower end of the internal threading to provide a step against which the cap abuts when in assembled relation. The internal surface 25 of the cap wall 22 defines a cylinder within which a piston and seat ring assembly 26 slides during operation of the valve when it opens and closes.

The piston and seat ring assembly includes a seat end plate 27, a seal ring end plate 28 in spaced relation therewith and a spacer or sleeve 29 holding the end plates apart in spaced relation. A plurality of connecting rods 30 are threadedly anchored in the seat end plate and extend freely through the holes in the seal ring end plate. Nuts 31 are threadedly received on the upper ends of the connecting rods, and provided with an end bearing surface 3/a that abuts against the upper side of the seal ring end plate 28 to lock the end plates and spacer together as a unit. Annular notches are provided at the opposite ends of the spacer 29 to telescopically receive the peripheral edge portions of the end plates to define a fitted assembly.

A piston seal ring 32 is mounted at the upper end of the piston and seat ring assembly with respect to the cylinder face 25 above the ports 19, while a valve seat ring 33 is mounted at the lower end of the assembly to coact with a valve seat 34 formed in the cylindrical wall 21 below the ports 19.

The piston seal ring 32 is Y-shaped and adapted to be spring loaded to seal against the cylinder face 25 and against a cylindrical face 35 formed on the upper end of the spacer 29 in inwardly spaced relation to the peripheral face 36 of the spacer. Accordingly, the seal ring 32, FIG. 4, includes an outer cylindrical face 37 for engagement with the cylinder face 25 and an inner cylindrical face 38 for engagement with the spacer cylindrical face 35. External grooves 39 are formed in the outer face 37, while an internal groove 40 is formed in the inner face 38, these being integral for greater sealing sensitivity. The seal ring 32 is made of Teflon, filled Teflon, or any other suitable chemically inert material capable of withstanding pressures, temperatures, and products encountered, and having good wear characteristics.

Figure 4:
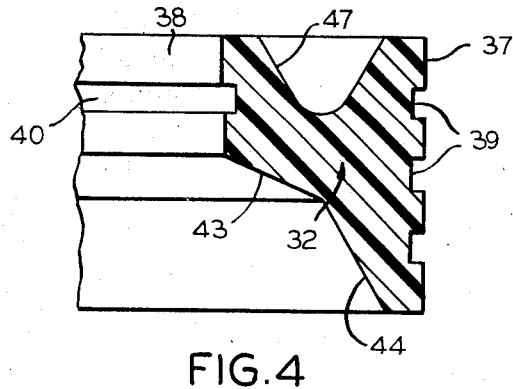
FIG. 4 is an enlarged cross-sectional view taken through the piston seal ring.
Figure 5:
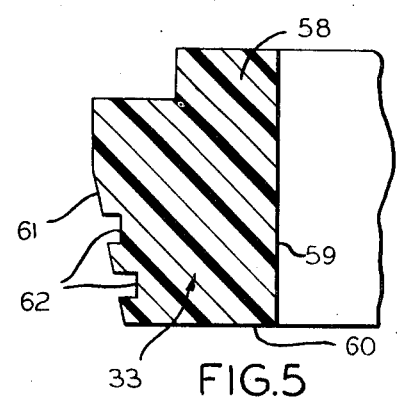
FIG. 5 is an enlarged cross-sectional view taken through the seal ring.

In order to provide positive sealing relationship between the seal ring 32 and the cylinder face 25 and spacer face 35, and to compensate for wear and/or thermal contracting and expanding conditions, the seal ring is spring loaded. Essentially, an annular notch is defined in the upper end of the spacer 29 by the cylindrical face 35 and connecting downwardly inclined surfaces 41 and 42 which extend from the lower edge of the cylindrical face 35 to the peripheral face 36. Similarly, connecting downwardly inclined surface 43 and 44, FIG. 4, are provided on the seal ring 32 between the outer and inner cylindrical faces 37 and 38. However, the angles of inclination are greater for these surfaces than for those on the spacer, whereby loading of the seal ring causes the faces to interact and urge the grooved faces in sealing engagement with the spacer and cylinder.

Loading of the seal ring 32 is accomplished by a piston seal ring loading plate 45 having a v-shaped seal ring engaging edge 46 engageable in a V-shaped lip 47 formed in the upper end of the seal ring 32. The V-shaped edge 46 is formed at the lower end of a skirt portion 48 depending from a plate portion 49 of the loading plate. Spring loading is applied to the loading plate by springs 50 provided on each nut 31 and bottomed at one end on a shoulder 51 of the nut and on the other end on the upper surface of the loading plate 45. Holes are provided in the loading plate to freely receive that portion of the nut that extends through and which locks the end plate and space together. An annular shoulder 52 on the nuts 31 limits the upward movement of the loading plate 45. Thus, the springs 50 spring load the seal ring 32.

The seat ring 33 is likewise made of Teflon, filled Teflon, or a suitable material like the seal ring 32. The seat ring 33 telescopically fits on the seat end plate 27, and is held in place by the space 29. An annular notch is defined on the seat end plate including an axially extending cylindrical surface 55 and a radially extending surface 56. Thus, a ledge is essentially defined on the lower peripheral end of the seat end plate to form a notch for receiving the seat ring 33. A lip 57 is formed on the lower end of the spacer 29 to coact with a lip 58 formed on the upper end of the seat ring 33 to prevent radial blowout of the seat ring. The internal face 59 of the seat ring is arranged in concentrically spaced relation to the axially extending cylindrical surface 55 of the end plate, while the lower radially extending wall 60 of the seat ring is adapted to abut against the radially extending surface 56 of the end plate. The external face 61 of the seal ring is tapered and coacts with the tapered seat 34 formed on the valve body below the ports 19. The external tapered construction of the seat ring is such so that it extends slightly outwardly to provide internal guiding to also provide a mechanical advantage for maximizes seating action. Further, this configuration lends itself to a self-cleaning action, thereby minimizing the chances for accumulation of foreign particles on either the seat ring or the valve seat. Grooves 62 are formed in the external face 61 to enhance the seating effects by reducing the net unit area on the annular seating surface.

The seating ring 33 is sized to be freely retained by the spacer and seat end plate so that the ring can squeeze inward slightly for self-aligning purposes between the cylinder and base. Thus, the seat ring may freely rotate on the piston assembly to facilitate assembly and prevent damage thereto since the piston and seat ring assembly will remain stationary with respect to the cylinder during assembly. Moreover, the free movement of the seat ring allows immediate release of any internal trapped vapors that might otherwise cause blowout of the seat ring. It can be further appreciated that the seating ring is reinforced by the lip on the spacer to prevent radial blowout. In the event of flashing or a seat burnout, the lip 57 on the spacer 29 functions as a secondary seat to preclude further flow of the product.

Figure 3:
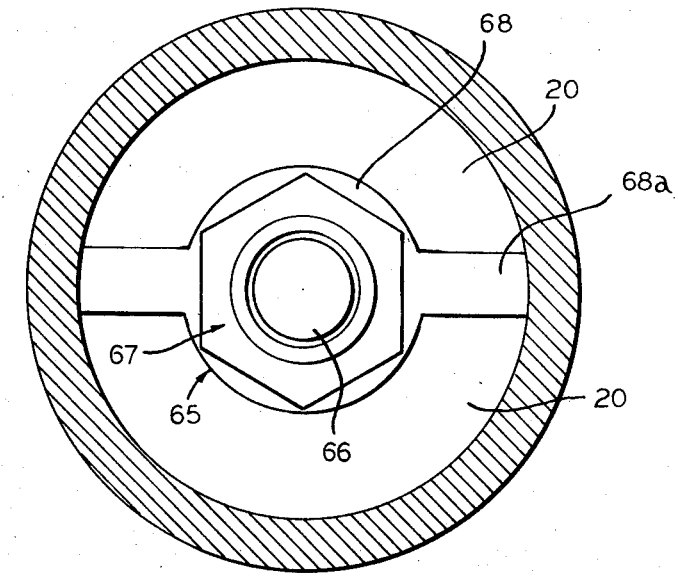
FIG. 3 is a sectional view taken substantially along line 3-3 of FIG. 2.
Figure 6:
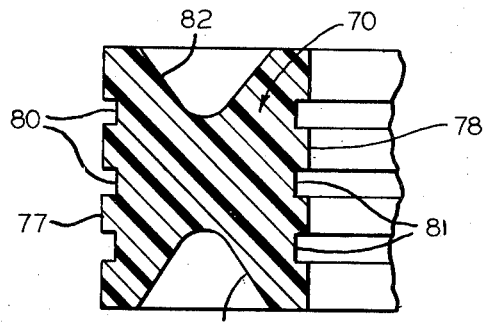
FIG. 6 is an enlarged cross-sectional view taken through the plunger seal ring.
Figure 7:
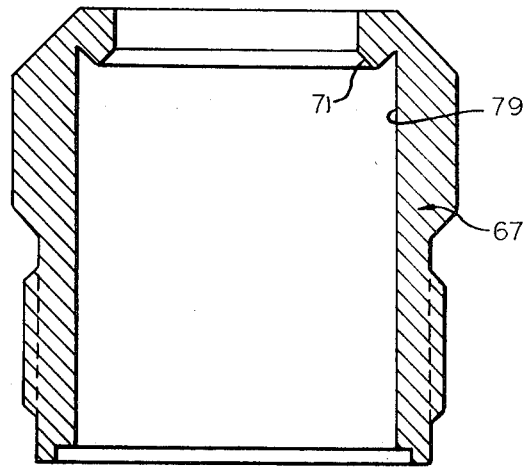
FIG. 7 is an enlarged vertical sectional view taken through the bonnet from the operating portion assembly.
Figure 8:
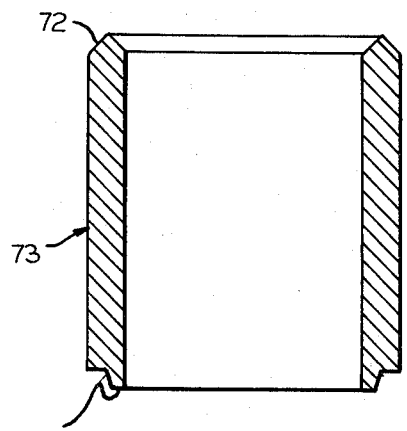
FIG. 8 is an enlarged vertical sectional view taken through the adapter sleeve of the operating portion assembly.

The valve is opened by energizing the operating plunger assembly, generally indicated by the numeral 65, which includes a plunger 66 slideably mounted in a cylinder defined by a bonnet 67 which is supported in a hub 68 integrally formed at the lower end of the body base 15 with bars 68a, FIG. 3, that extend from the cylindrical wall 21. Operating pressure, hydraulic or pneumatic, for driving the plunger 66, is admitted to the lower end of the plunger through the inlet port 69, and this pressurized fluid is isolated from the pressurized fluid with a valve by a plunger seal ring 70. The bonnet 67 is threadedly mounted in the hub 68 and seated on shoulder 63, and includes a downwardly projecting V-shaped ledge 71 coacting with an upwardly projecting inverted V-shaped end 72 of a spring-loaded adapter sleeve 73 to spring load the plunger seal ring 70 into sealing engagement with the plunger 66 and the bonnet 67. The sleeve 73 is freely received within the bonnet 67 and about the plunger 66. A spring 74 within the hub 68 surrounds the plunger 66, and is bottomed at the upper end against the lower edge 75 of the adapter sleeve 73 and at the lower end against a shoulder 76 formed within the hub 68. The upper and lower ends of the plunger are slightly rounded, and the cylindrical plunger face engages the inner cylindrical face 78, FIG. 6, of the seal ring 70.

The seal ring also includes an outer cylindrical face 77 which engages the inner cylindrical wall 79 of the bonnet 67. The plunger sea ring is shaped and functions to seal fluid in either direction, and in about the same manner as the piston seal ring 32. External grooves 80 on the internal face 78 and internal grooves 81 on the internal face 77 are integrally formed for greater sealing sensitivity. The dynamic sliding surface of the plunger sealing ring is the internal surface, this differing from the piston seal ring where the dynamic sliding surface is external.

Spring loading of the plunger seal ring 70 is accomplished by engagement of the bonnet ledge 71 with an upper V-shaped lip 82 on the ring, and the inverted V-shaped ledge 72 of the adapter sleeve 73 on the lower inverted V-shaped lip 83 of the ring. Thus, the X-shaped plunger seal ring is provided with dual V-shaped lips which tend to self-adjust from both sides by the combination of axial spring thrust, the vapor pressure, and the fluid operating pressure.

The plunger seal ring 70, like the piston seal ring 32, self-adjusts to any thermal contracting or expanding conditions, produces ideal wiping action, adjusts for wearing conditions, and facilitates assembly of the valve. The seal ring 70 is particularly self-adjusting to temperature-changing conditions when radial contraction of the seal is encountered. Leakage between the bonnet and hub is prevented by a gasket 64 of Teflon or the like mounted on the shoulder 63 and maintained in place by the coacting lower edge configurations of the bonnet and sleeve.

Figure 9:
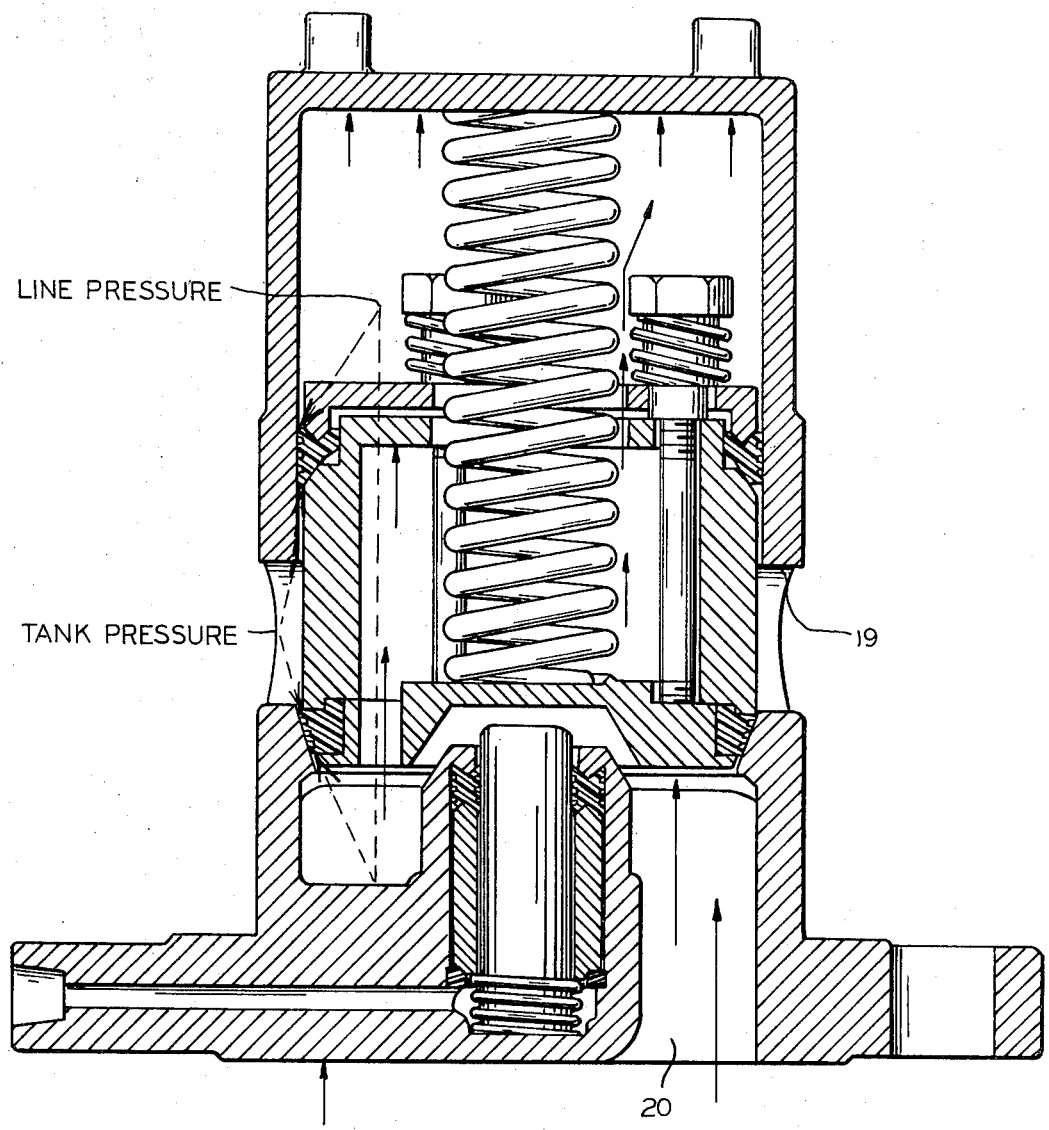
FIGS. 9 and 10 are diagrammatic and sectional views of the valve respectively illustrating the valve in closed and open positions.
Figure 10:
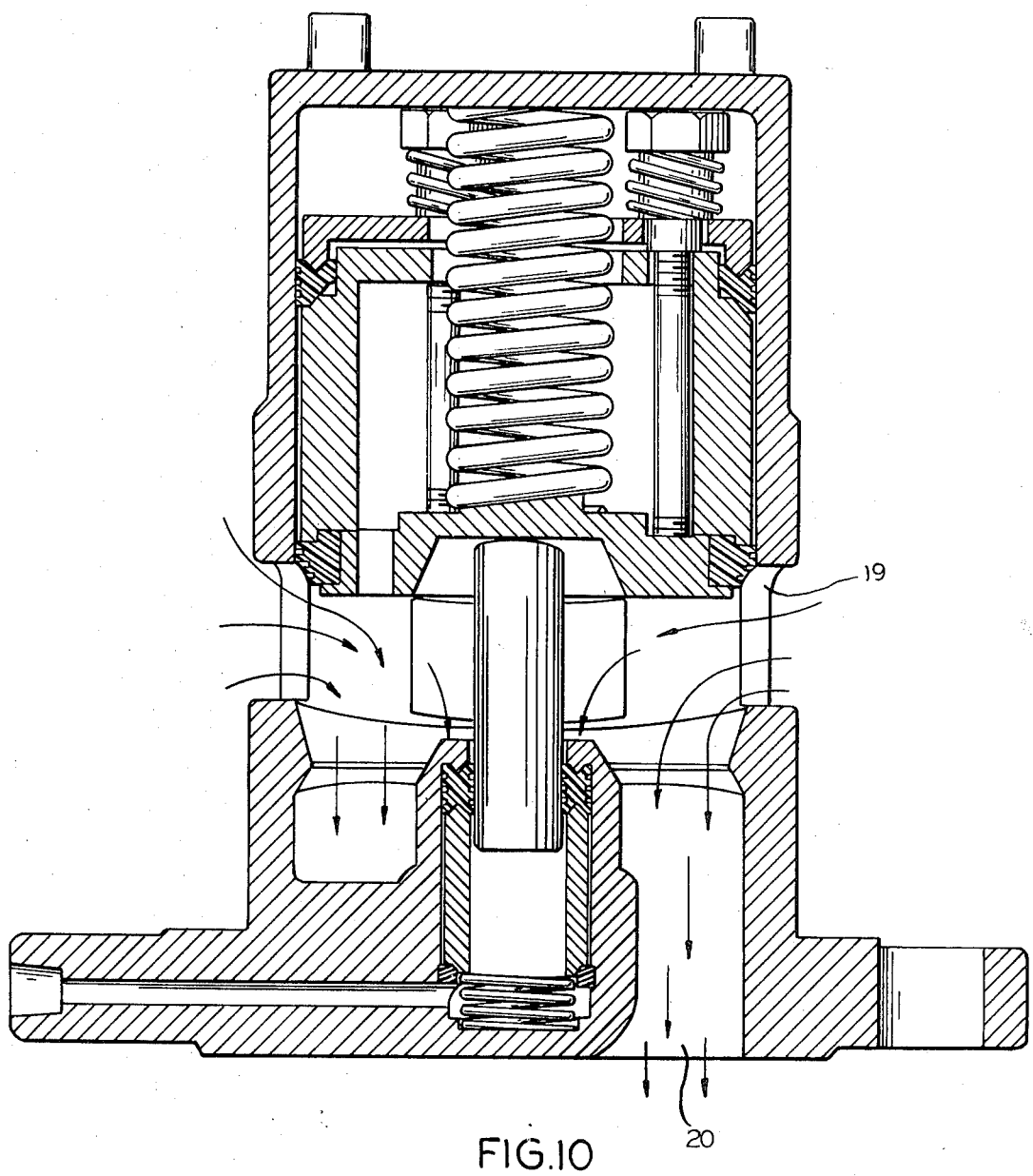

In operation, the valve is opened by applying an operating pressurized fluid through the inlet 69 to the plunger 66 which drives the plunger upwardly to engage the underside of the seat end plate 27 of the piston and seat ring assembly, and thereafter drive the piston and seat ring assembly, upwardly to its open position as shown in FIG. 10, thereby intercommunicating the ports 19 and passages 20 to permit product flow therethrough in the direction defined by the pressure of the vapor. The arrows indicate flow of the product out of the tank and into the line or mainfold. The valve is closed by removing the operating pressure on the plunger, and by the action of the closing spring 84 which is bottomed at one end on the cap wall 23 and at the other end on the seat end plate 27. The spring drives the piston and seat assembly into closed position and so the valve seat ring 33 sealingly engages the seat 34, as is shown in FIG. 2 and in FIG. 9. Openings are provided in the center of the seal ring end plate 28 and the piston seal ring loading plate 45 for the closing spring 84 and to also permit the product in the manifold or line to fully circulate within the valve. To this end, holes 85 are also provided in the seat end plate 27 to permit the product in the manifold or line to fully circulate within the valve. In closed position, the product vapor pressure in any pressure combination on either the tank side, or manifold or line side will be applied against the opposite sides of the piston seal ring 32 and the valve seat ring 33 to check close the valve in either direction. This is accomplished by utilizing a cylinder wall diameter and seating wall diameter that are approximately equal. Accordingly, the valve is normally closed, and opened upon supplying a pressurized operating fluid to the operating plunger assembly.

It will be understood that modifications and variations may be effected without departing from the scope of the novel concepts of the present invention.

The invention I hereby claim is as follows:

1. In combination with a tank and line arrangement adapted to handle a pressurized product, an internal safety shutoff and operating valve mounted within the tank and controlling product flow between the tank and line, said valve comprising a generally cylindrical body defined by a cylindrical wall closed at one end by an end wall, circumferentially arranged tank ports in the cylindrical wall intermediate the ends thereof and in direct communication with the product in the tank, a cylinder defined by the cylindrical wall on the side of the tank ports adjacent the end wall, an annular seat on the other side of the tank ports, a piston and seat assembly slidably received in said cylinder and coating with said seat to close said ports, said piston and seat assembly including a flexible seat ring mounted thereon to sealingly engage the seat when the assembly is in closed position, said seat ring being freely mounted on said assembly to compensate for wear and/or thermal expansion and contraction and to compensate for misalignment between said assembly and the seat and including means coacting with means on the assembly to confine the seat ring against radial blowout, a spring-loaded flexible seal ring means mounted on said piston and seat assembly effecting a seal between same and said cylinder, spring means within said body normally driving said piston and seat assembly to closed position, line ports at the end of the body opposite the end wall and leading to said seat, an operating plunger assembly at the end of the cylindrical wall opposite the end wall, said operating plunge assembly including a plunger adapted to be driven by pressurized fluid to engage and drive said piston and seat assembly into open position, said seal ring means and seat ring being so mounted on the piston and seat having about the same diameter whereby the valve checks close on both sides at any tank or line pressure.

2. The combination as defined in claim 1, wherein said seal ring means and seat ring are grooved on the sealing faces.

3. The combination as defined in claim 1, wherein said seat ring is externally tapered.

4. The combination as defined in claim 3, wherein said seal ring and seat ring are of a chemically inert material having good wearing characteristics, such as Teflon or the like.

5. The combination as defined in claim 1, wherein said operating plunger assembly includes a cylinder in which said plunger is slidably mounted, and a flexible spring loaded X-shaped seal ring sealing said plunger and cylinder against leakage of plunger operating pressurized fluid and against entry into the cylinder of pressurized product.

6. The combination as defined in claim 5, wherein said plunger seal ring is of Teflon and is grooved on the sealing faces.

7 The combination as defined in claim 1, wherein said seal ring means in Y-shaped.